United States Patent Office 3,449,292
Patented June 10, 1969

3,449,292
POLYHYDROXYETHERS STABILIZED WITH ORGANIC PHOSPHITES
Robert H. Snedeker, New Brunswick, N.J., assignor to Union Carbide Corporation, a corporation of New York
No Drawing. Continuation-in-part of application Ser. No. 386,393, July 30, 1964. This application Sept. 22, 1967, Ser. No. 669,702
Int. Cl. C08g *43/00, 51/58*
U.S. Cl. 260—45.7       13 Claims

ABSTRACT OF THE DISCLOSURE

Thermoplastic polyhydroxyethers have the general formula:

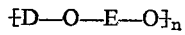

wherein D is the radial residuum of a rihydric phenol, E is a hydroxyl containing radical residuum of an epoxide and $n$ represents the degree of polymerization and is at least 30 have been rendered color stable at temperatures up to about 550° F. by incorporating up to 0.8 parts of triorgano phosphites in them.

---

This is a continuation-in-part of Ser. No. 386,393 filed July 30, 1964, now abandoned.

This invention relates to thermally color stable thermoplastic polyhydroxyether compositions. More particularly it relates to compositions of thermoplastic polyhydroxyether containing triorgano phosphites as thermal color stabilizers.

The thermoplastic polyhydroxyethers of this invention are tough resins having an ultimate tensile strength of 9000–9500 p.s.i., a softening temperature of about 185–190° F. and are readily injection molded at about 500–550° F. into myriad useful structural articles such as casings, gears, containers, panels and the like. In this temperature range of 500–550° F. there is no noticeable polymer degradation or loss of physical or mechanical strength. However, exposure of these themroplastic polyhydroxyethers to temperature in the range of 500–550° F. does result in color formulation as evidenced by a change from pale yellow to dark yellow and even amber upon continued prolonged exposure. While there is no loss of mechanical properties accompanying the color formation, it is undesirable aesthetically and limits the use of thermoplastic polyhydroxyethers in areas where clarity of the molded article is important.

It is, therefore, an object of this invention to provide a thermoplastic polyhydroxyether composition which is thermally color stable.

It is another object to retain the desirable physical properties of thermoplastic polyhydroxyethers while improving color stability.

It has now been found that these objects can be achieved with a composition comprising:

(a) thermoplastic polyhydroxyether having the general formula:

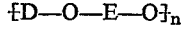

wherein D is the radical residuum of a dihydric phenol, E is an hydroxyl containing radical residuum of an epoxide and $n$ represents the degree of polymerization and is at least 30; and (b) an effective amount up to about 0.8 parts by weight per hundred parts of thermoplastic polyhydroxyether of a triorgano phosphite represented by the structure:

wherein each of R′, R″ and R‴ is a hydrocarbon group.

The term "thermoplastic polyhydroxyether" herein refers to substantially linear polymers having the general formula:

wherein D is the radical residuum of a dihydric phenol, E is an hydroxyl containing radical residuum of an epoxide, and $n$ represents the degree of polymerization and is at least 30 and is preferably 80 or more. Polyhydroxyethers having melt flows of less than about 20 determined as hereinafter described are preferred.

The dihydric phenol contributing the phenol radical residuum, D, can be either a dihydric mononuclear phenol such as hydroquinone, catechol and resorcinol or a dihydric polynuclear phenol such as those having the general formula:

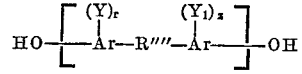

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and R″″ is a bond between adjacent carbon atoms as in dihydroxydiphenyl or is a divalent radical including, for example

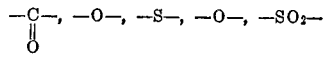

and —S—S—, hydrogen radicals such as alkylene, alkylidene, cycloaliphatic, e.g., cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group or $R_1$ can be polyalkoxy, or polysiloxy or two or more alkylidene radicals separated by an aromatic ring, a tertiary amino group, an ether linkage, a carbonyl group or a sulfur containing group such as sulfoxide, and the like. Exemplary dihydric phenols include: the bis(hydroxyphenyl)alkanes such as 2,2 - bis(4 - hydroxyphenyl)propane, 2,4′ - dihydroxydiphenylmethane, bis(2-hydroxyphenyl)methane, bis(4-hydroxyphenyl)methane, bis(4 - hydroxy - 2,6-dimethyl-3-methoxyphenyl)methane, 1,1 - bis(4 - hydroxyphenyl) ethane, 1,2-bis(4 - hydroxyphenyl)ethane, 1,1-bis(4-hydroxy - 2 - chlorophenyl)ethane, 1,1-bis(3-methyl-4-hydroxyphenyl)ethane, 1,3-bis(3-methyl-4-hydroxyphenyl) propane, 2,2-bis(3-phenyl-4-hydroxyphenyl)propane, 2,2- bis(3-isopropyl-4-hydroxyphenyl)propane, 2,2-bis(2-isopropyl - 4 - hydroxyphenyl)propane, 2,2-bis(4-hydroxynaphthyl)propane, 2,2 - bis(4 - hydroxyphenyl)pentane, 3,3-bis(4-hydroxyphenyl)pentane, 2,2-bis(4-hydroxyphenyl)heptane, bis(4-hydroxyphenyl)phenylmethane, bis(4-hydroxyphenyl)cyclohexylmethane, 1,2 - bis(4-hydroxyphenyl - 1,2-bis(phenyl)propane, 2,2-bis(4-hydroxyphenyl)-phenylpropane and the like;

Di(hydroxyphenyl)sulfones such as bis(4-hydroxyphenyl)sulfone, 2,4'-dihydroxydiphenyl sulfone, 4'-chloro-2,4'-dihydroxydiphenyl sulfone, 5'-chloro-4,4'-dihydroxydiphenyl sulfone and the like; and Di(hydroxyphenyl)ethers such as bis(4-hydroxyphenyl)ether, the 4,3'-, 4,2'-, 2,2'-dihydroxydiphenyl ethers, 4,4'-dihydroxy-2,6-dimethyldiphenyl ether, bis(4-hydroxy-3-isobutylphenyl) ether, bis(4-hydroxy-3-isopropylphenyl) ether, bis(4-hydroxy-3-chlorophenyl)ether, bis(4-hydroxy-3-fluorophenyl)ether, bis(4-hydroxy - 3 - bromophenyl) ether, bis(4 - hydroxynaphthyl)ether, bis(4-hydroxy-3-chloronaphthyl)ether, bis(2-hydroxydiphenyl)ether, 4,4'-dihydroxy-2,6-dimethoxydiphenyl ether, 4,4'-dihydroxy-2,5-diethoxydiphenyl ether and the like.

Also suitable are the bisphenol reaction products of 4-vinylcyclohexene and phenols, e.g., 1,3-bis(hydroxyphenyl)-1-ethylcyclohexane, and the bisphenol reaction products of dipentene or its isomers and phenols such as 1,2-bis(p-hydroxyphenyl) - 1 - methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula:

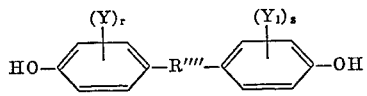

wherein Y and $Y_1$ are as previously defined, $r$ and $z$ have values from 0 to 4 inclusive and R'''' is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus,

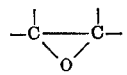

a monoepoxide contains one such oxirane group and provides a radical residuum E containing a single hydroxyl group; a diepoxide contains two such oxirane groups and provides a radical residuum E containing two hydroxyl groups. Saturated epoxides, by which term is meant diepoxides free of ethylenic unsaturation, i.e.,

and acetylenic unsaturation, i.e., —C≡C—, are preferred. Particularly preferred are halogen substituted saturated monoepoxides, i.e., the epihalohydrin and saturated diepoxides which contain solely carbon, hydrogen and oxygen, especially those wherein the vicinal or adjacent carbon atoms form part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epihalohydrins such as epichlorohydrin, epibromohydrin, 1,2-epoxy-1-methyl-3-chloropropane, 1,2 - epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexylmethyl)adipate, bis(3,4 - epoxycyclohexylmethyl)phthalate, 6-methyl-3,4-epoxycyclohexylmethyl 6 - methyl-3,4-epoxycyclohexane carboxylate, 2-chloro-2,4-epoxycyclohexylmethyl 2 - chloro-3,4-epoxycyclohexanecarboxylate, diglycidyl ether, bis(2,3-epoxycyclopentyl)ether, 1,5-pentanediol bis(6-methyl - 3,4 - epoxycyclohexylmethyl) ether, bis(2,3-epoxy-2-ethylhexyl)adipate, diglycidyl maleate, diglycidyl phthalate, 3-oxatetracyclo-[4.4.0.1$^{7,10}$.0$^{2,4}$] undec-8-yl, 2,3-epoxypropyl ether, bis(2,3-epoxycyclopentyl)sulfone, bis(3,4-epoxyhexoxypropyl)sulfone, 2,2'-sulfonyldiethyl bis(2,3-epoxycyclopentanecarboxylate), 3-oxatetracyclo[4.4.0.1$^{7,10}$.0$^{2,4}$]undec-8-yl 2,3 - epoxybutyrate, 4-pentenal-di(6 - methyl-3,4-epoxycyclohexylmethyl) acetal, ethylene glycol bis(9,10-epoxystearate), diglycidyl carbonate, bis(2,3-epoxybutylphenyl)2-ethylhexyl phosphate, diepoxydioxane, butadiene dioxide and 2,3-dimethylbutadiene dioxide. The preferred diepoxides are those wherein each of the oxirane groups is connected to an electron donating substituent which is not immediately connected to the carbon atoms of that oxirane group.

Such diepoxides have the grouping

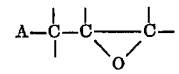

wherein A is an electron donating substituent such as

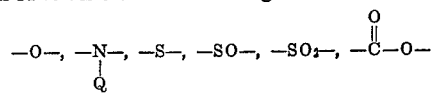

or

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

Melt flow of each of the thermoplastic polyhydroxyethers was determined by weighing in grams the amount of polyhydroxyether which, at a temperature of 220° C. and under a pressure of 44 p.s.i., flowed through an orifice having a diameter of 0.0825" and a length of 0.315" over a ten-minute period. Four such determinations were made and the average of the four determinations is reported as decigrams per minute under a pressure of 44 p.s.i. and at 220° C.

The thermoplastic polyhydroxyether used in the examples unless otherwise stated was prepared by the reaction of equimolar amounts of 2,2-bis(4-hydroxyphenyl)propane and epichlorohydrin together with sodium hydroxide. Equipment used was provided with a sealed stirrer, thermometer, and reflux condenser. There was placed therein:

| | Parts |
|---|---|
| 2,2-bis(4-hydroxyphenyl)propane (0.5 mole) | 114.5 |
| Epichlorohydrin (99.1%) pure (0.5 mole) | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty milliliters of a 7:3 mixture of toluene:butanol was added. Heating of the mixture at 80° C. was continued another two hours. There was added an additional 50 parts of the 7:3 toluene-butanol mixture and 4.5 parts of phenol. The contents of the vessel were continued to be heated at 80° C. (reflux) for 2½ hours. Upon cooling, the reaction mixture was cut with 200 parts of the 7:3 toluene: butanol mixture. One hundred parts of water were added and agitated with the contents to dissolve salts present in the reaction mixture. The vessel contents were allowed to settle for ten minutes during which time a lower brine phase formed. This lower phase was separated by decantation. The upper polymer solution containing phase was washed successively with two 160 part portions of water containing 4.5% butanol. The washed polymer solution was acidified by stirring the solution with a mixture of 1 part of 85% phosphoric acid with 100 parts of water (pH=2) for one hour. The upper polymer solution phase was again separated by decantation and water washed with four successive 200 part portions of water containing 4.5% butanol. The washed polymer was then coagulated in 1,000 parts of isopropanol, filtered and dried. There was obtained a thermoplastic polyhydroxyether of 2,2-bis(4-hydroxyphenol-propane and epichlorohydrin having a melt flow of 7.0 decigrams per minute.

Thermoplastic polyhydroxyethers having a melt flow between 0.5 and 20 and more particularly 1 to 10 provide excellent formable structures and articles and are, therefore, preferred.

The thermoplastic poly(hydroxyethers) thus produced have reduced viscosities of at least 0.43. Reduced viscosity values were computed by use of the equation:

$$\text{Reduced viscosity} = \frac{t_s - t_o}{ct_o}$$

wherein $t_o$ is the efflux time of the solvent (tetrahydrofuran), $t_s$ is the efflux time of the poly(hydroxyether) solution, $c$ is the concentration of the poly(hydroxyether) solution in terms of grams of poly(hydroxyether) per 100 ml. of tetrahydrofuran.

The thermoplastic polyhydroxyethers of the present invention are substantially free of 1,2-epoxy groups as evidenced by the application of the two "epoxide equivalent" analytical tests described in "Epoxy Resins" by H. Lee and K. Neville, pages 21–25, McGraw-Hill Book Co., Inc., N.Y. (1957). In the first test which involves the reaction of 1,2-epoxy groups with a known amount of hydrochloric acid followed by back-titration of the acid consumed, no hydrochloric acid was consumed. In the second test in which the infrared absorbance at 10.95 and 11.60μ (wave lengths at which 1,2-epoxy groups absorb light) no absorbance was demonstrated by the thermoplastic polyhydroxyethers. Thus it may be concluded that within the experimental limits of these standard tests no 1,2-epoxy groups are present in these thermoplastic polyhydroxyethers.

Curing agents, for example, amines, such as imidazole and N,N-dimethylbenzylamine have no curing or hardening effect on thermoplastic polyhydroxyethers in sharp contrast with their effect on liquid or solid epoxy resins which are hardened into thermoset resins with such curing agents.

The triorganophosphites employed as thermal color stabilizers for thermoplastic polyhydroxyethers are those phosphites having a structure corresponding to the formula:

wherein R', R" and R''' may be the same or different hydrocarbon group, which can be substituted if desired with other inert groups, designate an alkyl, cycloalkyl, aryl, alkyl-aryl, aralkyl or alkaryl radical, preferably each containing up to about 18 carbon atoms, or slightly higher. The alkyl radicals contemplated in this respect can be either linear, branch-chained or cyclic. In addition, each of the radicals designated by R', R" and R''' can be substituted by various inert substituent groups such as hydroxy, alkoxy, aryloxy, halogen, carbalkoxy or acyloxy radicals, as long as such group does not react with the hydroxyl groups of the polyhydroxyether. As typical of the radicals designated by R', R" and R''' there can be mentioned methyl, ethyl, propyl, isopropyl, butyl, pentyl, hexyl, heptyl, 2-ethylhexyl, octyl isooctyl nonyl, decyl, dodecyl, hexadecyl, octadecyl, cyclopentyl, cyclohexyl, phenyl, biphenyl, naphthyl, methylphenyl, ethylphenyl, phenylethyl, phenylhexyl, hydroxyethyl, methoxyethyl, phenoxyhexyl, carbethoxyethyl, benzohexyl, hydroxyphenyl, methoxyphenyl, carbethoxyphenyl radicals and the like. Thus as employed herein, the term "hydrocarbon group" designates the basic character of the R groups but should not limit it to exclude other non-reactive and inert groups that are neither carbon nor hydrogen.

Representative triorgano phosphites encompassed within this invention and suitable as thermal color stabilizers include, among others, the trialkyl phosphites such as trimethyl phosphite, triethyl phosphite, tripropyl phosphite, tributyl phosphite, or triisobutyl phosphite, tripentyl phosphite, triheptyl phosphite, trihexyl phosphite, trioctyl phosphite, trinonyl phosphite, tridecyl phosphite, tridodecyl phosphite, trioctadecyl phosphite, tricyclohexyl phosphite, diethyl butyl phosphite, tri(8-hydroxyoctyl) phosphite, tri(2-ethoxyethyl)phosphite and the like; the triaryl phosphites such as triphenyl phosphite, tri-1-naphthylphosphite, tri-2-naphthyl phosphite, tri-1-anthryl phosphite; monoaryl dialkyl phosphites such as phenyl dimethyl phosphite, phenyl diethyl phosphite, phenyl dipropyl phosphite, phenyl dibutyl phosphite, phenyl dipentyl phosphite, phenyl diheptyl phosphite, phenyl dihexyl phosphite, phenyl dioctyl phosphite, phenyl dinonyl phosphite, phenyl didecyl phosphite, phenyl diisodecyl phosphite, phenyl didodecyl phosphite, 1-naphthyl didecyl phosphite, and the like; and the diaryl monoalkyl phosphites such as diphenyl methyl phosphite, diphenyl ethyl phosphite, diphenyl propyl phosphite, diphenyl butyl phosphite, diphenyl isobutyl phosphite, diphenyl pentyl phosphite, diphenyl heptyl phosphite, diphenyl hexyl phosphite, diphenyl octyl phosphite, diphenyl nonyl phosphite, diphenyl decyl phosphite, diphenyl isodecyl phosphite, diphenyl dodecyl phosphite, di-1-anthryl ethyl phosphite, and the like.

One preferred single group of triorgano phosphites is the unsubstituted diaryl alkyl phosphites and especially those containing alkyl groups of from about 4 to about 12 carbon atoms in each alkyl group. The most preferred single diaryl alkyl phosphites are: diphenyl octyl phosphite and diphenyl decyl phosphite. Another preferred group of triorgano phosphites is the trialkaryl phosphites, of which tri(nonylphenyl) phosphite is especially preferred both because of color stabilizing efficacy and commercial availability.

The triorgano phosphites used as stabilizers in this invention are, in general, well-known compounds. They can be prepared, for example, by methods disclosed in Organophosphorous Compounds, G. M. Kosolapoff, Wiley & Sons, Inc., New York (1950), at pages 184–185 et seq.

It is preferred to use about 0.3 to 0.8 part by weight of triorgano phosphite per 100 parts of PHE with 0.4 to 0.6 part being particularly preferred. It was surprisingly found that only an extremely narrow range of triorgano phosphite is effective in the compositions of this invention and going beyond the upper limit of about 0.8 part per hundred of PHE not only did not afford enhanced color stability but actually lowered color stability. This discovery was quite unexpected considered in the light of the experiences of those skilled in the art of polymer stabilization. Thus for example when tri(nonylphenyl)phosphite was incorporated into a liquid epoxy resin-diethylene triamine hardener system at a concentration of 0.5 part by weight of phosphite per hundred parts of epoxy resin there was no improvement in the color stability of either a room temperature cured or high temperature cured samples.

The present invention is illustrated by the examples which follow in which all parts and percentages are by weight unless otherwise specified:

EXAMPLE 1

A series of representative organic phosphites were milled into thermoplastic polyhydroxyether (PHE) having a melt flow of 2.3, at 160° C. in a two-roll mill to afford compositions containing about 0.5 part of phosphite per hundred parts of thermoplastic polyhydroxyether. The color stability of these compositions were compared with a Control (A) of thermoplastic polyhydroxyether containing no phosphite under three sets of conditions, viz.

(1) After normal milling, i.e., ten end passes (approximately 10 minutes).

(2) After extended milling, i.e., ten end passes plus 15 minutes additional working on the roll-mill. Samples were removed at this point and compressed in molding pliers for visual color assessment.

(3) After 15 minutes at 300° C. in a Plastometer, which condition followed the normal milling described above (No. 1). Samples were subsequently extruded into molding pliers for color appraisal.

The Plastometer used consisted of a smooth, straight, cylindrical steel thermostat, ⅝" in diameter. During the thermal exposure, the bottom of the cylinder was plugged with a spring-loaded, round topped, slightly oversized rod, while the top was plugged with a piston to maintain temperature consistency and uniformity.

The color stability ratings were obtained by visual observations according to the following code:

(1) Vastly superior to the control.
(2) Moderately better than the control.
(3) Slightly better than the control.
(4) Equivalent to the control.
(5) Inferior to the control.

The results are compiled in Table 1.

An examination of the comparative data in Table 1 reveals that the color degradation exhibited by the untreated control is largely prevented by the presence of various phosphites. Of those described in this example, the best candidates were diphenyl decyl phosphite, diphenyl octyl phosphite and tri(nonylphenyl)phosphite.

TABLE 1

| Phosphite | After normal milling | After extended milling | After 15 min. at 300° C. in Plastometer |
|---|---|---|---|
| Control A | (1) | (2) | (3) |
| (a) Diphenyl decyl | 3 | 1 | 1 |
| (b) Tridecyl | 3 | 2 | 1 |
| (c) Trioleyl | 3 | 2 | 2 |
| (d) Trilauryl trithio | 3 | 1 | 3 |
| (e) Diallyl | 3 | 2 | 1 |
| (f) Bis(tert. butyl cresyl) phenyl | 4 | 2 | 3 |
| (g) Diphenyl octyl | 3 | 1 | 1 |
| (h) Pentaerithritol | 3 | 1 | 2 |
| (i) Tri(nonylphenyl) | 3 | 1 | 1 |

1 Slightly yellow.  2 Darker yellow.  3 Amber brown.

EXAMPLES 2–5

Experiments similar to those described in Example 1 were repeated at levels of 0.2, 0.4, 0.6 and 0.8 part by weight of the triorgano phosphite per hundred parts of thermoplastic polyhydroxyether. Enhanced color stability was achieved at all levels enumerated above.

EXAMPLE 6

The experiments described in Examples 2–5 were repeated at two levels of 0.25 and 0.5 part by weight triorgano phosphite per hundred of thermoplastic polyhydroxyether with one difference, viz., the triorgano phosphite stabilizer was added to the polyhydroxyether during the process of the preparation of the latter prior to its isolation from the solvent system. The initial color of the polyhydroxyether thus isolated was improved over that normally isolated having no added phosphite stabilizer.

EXAMPLE 7

Various physical and electrical properties of a composition containing 0.5 part of tri(nonylphenyl)phosphite per hundred parts of thermoplastic polyhydroxyether (melt flow of 11.1) were compared with the unmodified polyhydroxyether as a control. The data obtained as shown in Table 2 indicate that no significant loss of desirable electrical or physical properties of the base resin results by incorporation of triorgano phosphite thermal color stabilizer into a thermoplastic polyhydroxyether.

TABLE 2

| | Unmodified PHE | Phosphite-modified PHE |
|---|---|---|
| Dielectric constant: | | |
| 1 kc | 4.15 | 4.14 |
| 60 kc | 4.16 | 4.16 |
| 1 mc | 3.82 | 3.82 |
| Dissipation factor: | | |
| 1 kc | $1.89 \times 10^{-3}$ | $1.94 \times 10^{-3}$ |
| 60 kc | $1.10 \times 10^{-3}$ | $1.21 \times 10^{-3}$ |
| 1 mc | $31.34 \times 10^{-3}$ | $30.77 \times 10^{-3}$ |
| Heat Dist. Temp. (264 p.s.i.), °C | 86.4 | 84.5 |
| Tensile Strength, p.s.i | 8,810 | 8,780 |
| Flexural Strength, p.s.i | 14,140 | 14,260 |
| Tensile Modulus, p.s.i | 350,000 | 350,000 |
| Flexural Modulus, p.s.i | 390,000 | 400,000 |
| Elongation, percent | 85.0 | 59.5 |
| Falling dart, ft | 4.65 | 4.85 |
| Tensile impact str., ft./lbs./in.³ | 428 | 400 |
| Color Factor | 116 | 82 |

The falling dart value is the mean height in feet from which a 10-pound hemispherical tipped torpedo causes fracture of a specimen ⅛" thick.

Color Factor is obtained by determining the purity value from the integration of a spectrophotometric curve, and dividing by specimen thickness. An increase in the Color Factor is indicative of a deepening of the color (yellow in the case of PHE), that is, a worsening of color stability.

In order to describe the measurement of Color Factor, its basis and significance, a brief look at the spectrophotometry by which it is determined is in order. In the first place, a recording spectrophotometer produces a curve representing the quantity versus the quality of the light of a spectrum transmitted by (or reflected from) a sample. A Librascope attachment automatically integrates the area under the curve, yielding tristimulus values (X, Y, and Z) which are theoretical colored light sources. Although these cannot be practically produced, they parallel what the eye sees as red-green, lightness, and blue-yellow, respectively.

The tristimulus values are then converted into trichloromatic values (x, y, and z) as follows:

$$x = \frac{X}{X+Y+Z} \quad y = \frac{Y}{X+Y+Z} \quad z = \frac{Z}{X+Y+Z}$$

which, with the aid of published chromaticity diagrams, yield Dominant Wavelength, Luminance, and Purity, the three coordinates by which color is defined.

Since the characteristic discoloration of the PHE and epoxy resins which is to be measured is in the yellow region of the spectrum, then the Purity value, which may also be considered as intensity or percent of the pure spectrum color, may be used as a measure of such discoloration. Dividing through by thickness resolves cross-sectional differences and yields the Color Factor.

Luminance.—Defines the relative lightness or darkness of the sample and is equal to the Y value, i.e., the higher the luminance value the lighter the sample. The highest value corresponds to white, the lowest to black and all in between to gray. The luminance can be read directly from the transmittance curve as obtained from a calibration standard. It is approximately equal to the percent transmission at 550 mμ. If this value disagrees sharply with the Y value written on the graph, then there has been a mistake in the integration of the spectrum.

Dominant Wavelength is the wavelength of that part of the spectrum which is to be mixed with a fixed neutral light (daylight) to give the color of the sample. It is obtained from the x and y values.

Purity.—Indicates the amount of spectrum color at the dominant wavelength in a sample relative to the pure spectrum color. Purity and appearance are a function of sample thickness. This is illustrated in the following manner: A sample with a dominant wavelength of 640 mμ will look red in thick discs and pink in a thin disc. The corresponding purity values will be high for the thick sample and low for the thin sample.

While up to about 0.8 part of triorgano phosphite by weight per hundred parts of thermoplastic polyhydroxyether can be used in the compositions of this invention, it is preferred to use about 0.3 to 0.8 parts per hundred.

The triorgano phosphite stabilizer can be added to the thermoplastic polyhydroxyether during the preparation of the latter or after the latter has been isolated from the preparation media. Mixing or dry blending of these two components can be accomplished by any conventional mixing process such as Banbury mixing, roll-milling, extrusion compounding and the like. The mixing temperature is not critical and so temperatures to about 500° F. and even higher can be employed.

If desired, the phosphite stabilizer and polyhydroxyether composition can be prepared by dissolving both components in a mutual solvent, followed by evaporation of the solvent. Suitable solvents for this purpose include aliphatic ketones such as methyl ethyl ketone, and mixtures of aromatic hydrocarbons and aliphatic alcohols such as mixtures of toluene and n-butanol.

It is preferred to carry out the mixing operation at atmospheric pressures although subatmospheric and superatmospheric pressures can also be used, if desired.

The following tests were used to evaluate the compositions of the present invention:

| TEST | |
|---|---|
| Dielectric constant | D–150–54T |
| Dissipation factor | D–150–54T |
| Izod impact strength | D–256–56 |
| Heat distortion temp. | D–648–56 |
| Tensile strength | D–638–61T |
| Flexural strength | D–790–61T |
| Tensile modulus | D–638–61T |
| Flexural modulus | D–790–61T |
| Elongation | D–638–61T |
| Tensile impact strength | D–1822–61 |

EXAMPLE 8

When Example 1 was repeated using 1.0 part of tri-(nonylphenyl) phosphite per hundred parts of thermoplastic polyhydroxyether there was a marked visual decrease in the thermal color stability.

In order to demonstrate conclusively that the color stabilizing effects of triorgano phosphites on thermoplastic polyhydroxyethers are not parallel in a thermoset epoxy resin system the following Controls were run.

Controls B, C, D and E

One hundred parts of a commercially available epoxy resin derived from bisphenol A and epichlorohydrin having an epoxy assay of 175–185 was blended with 10.6 parts of diethylene triamine hardener and casting made from the mixture. Half of the castings were allowed to cure at room temperature and designated Control B. The other half were post cured at a temperature of 100° C. for two hours after room temperature curing and designated Control D.

Controls C and E were prepared in the same manner as Controls B and D with the exception that the epoxy resin-hardener mixture also contained 0.5 part of tri-(nonylphenyl) phosphite, incorporated therein.

The Color Factor was determined on Controls B, C, D and E and are shown in Table 3.

TABLE 3

| Control: | Color factor |
|---|---|
| B | 45 |
| C | 46 |
| D | 37 |
| E | 38 |

It can thus be seen that the incorporation of a triorgano phosphite in a commonly used thermosetting epoxy resin composition did not enhance color stability. If anything the phosphite containing compositions were less stable than those containing no phosphite stabilizer.

Although the invention has been described in its preferred forms, it is understood that the present disclosure has been made only by way of example, and that numerous changes in the details may be resorted to without departing from the spirit and scope of the invention.

What is claimed is:
1. Thermally color stable composition comprising:
  (a) thermoplastic polyhydroxyether that contains no 1,2-epoxy groups having the general formula:

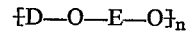

wherein D is the radical residuum of a dihydric phenol, E is an hydroxyl containing radical residuum of an epoxide and n represents the degree of polymerization and is at least 30; and
  (b) an effective amount up to about 0.8 parts by weight per hundred parts of thermoplastic polyhydroxyether of a triorgano phosphite represented by the structure

wherein each of R′, R″ and R‴ is a hydrocarbon radical.
2. Thermally color stable composition comprising:
  (a) thermoplastic polyhydroxyether that contains no 1,2-epoxy groups having the general formula:

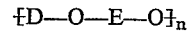

wherein D is the radical residuum of a dihydric phenol, E is an hydroxyl containing radical residuum of an epoxide and n represents the degree of polymerization and is at least 80; and
  (b) an effective amount up to about 0.8 parts by weight per hundred parts of thermoplastic polyhydroxyether of a triorgano phosphite represented by the structure:

wherein each R′, R″ and R‴ is a hydrocarbon radical.
3. Thermally color stable composition comprising:
  (a) thermoplastic polyhydroxyether that contains no 1,2-epoxy groups having the general formula:

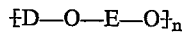

wherein D is the radical residuum of a polynuclear dihydric phenol, E is an hydroxyl containing radical residuum of an epihalohydrin and n represents the degree of polymerization and is at least 30; and
  (b) an effective amount up to about 0.8 part by weight per hundred parts of thermoplastic polyhydroxyether of a triorgano phosphite represented by the structure:

wherein each of R', R" and R'" is a hydrocarbon radical.

4. Thermally color stable compositions comprising:
(a) thermoplastic polyhydroxyether that contains no 1,2-epoxy groups having the general formula:

$$\text{\textendash}[D\text{\textendash}O\text{\textendash}E\text{\textendash}O]_n\text{\textendash}$$

wherein D is the radical residuum of a polynuclear dihydric phenol, E is an hydroxyl containing radical residuum of an epihalohydrin and $n$ represents the degree of polymerization and is at least 80; and
(b) an effective amount up to about 0.8 part by weight per hundred parts of thermoplastic polyhydroxyether of a triorganophosphite represented by the structure:

wherein each of R', R" and R'" is a hydrocarbon radical.

5. Composition claimed in claim 3 wherein the polynuclear dihydric phenol is 2,2-bis(4-hydroxyphenyl)propane.

6. Composition claimed in claim 4 wherein the polynuclear dihydric phenol is 2,2-bis(4-hydroxyphenyl)propane.

7. Composition claimed in claim 1 wherein the triorgano phosphite is a tri(alkaryl) phosphite.

8. Composition claimed in claim 1 wherein the triorgano phosphite is a diaryl alkyl phosphite.

9. Composition claimed in claim 1 wherein the triorgano phosphite is trialkyl phosphite.

10. Composition claimed in claim 7 wherein the tri(alkaryl) phosphite is a tri(nonyl phenyl)phosphite.

11. Composition claimed in claim 8 wherein the diaryl alkyl phosphite is diphenyl decyl phosphite.

12. Composition claimed in claim 8 wherein the diaryl alkyl phosphite s diphenyl octyl phosphite.

13. Composition claimed in claim 9 wherein the trialkyl phosphite is tridecyl phosphite.

References Cited

UNITED STATES PATENTS

| 2,558,949 | 7/1951 | Greenlee | 260—47 |
| 3,115,465 | 12/1963 | Orloff et al. | 252—49.9 |
| 3,240,751 | 3/1966 | Cannon et al. | 260—45.75 |
| 3,269,979 | 8/1966 | Snedeker | 260—45.85 |

OTHER REFERENCES

Lee et al.: Epoxy Resins, 1957, p. 15.
Stille: Introduction to Polymer Chemistry, 1962, pp. 128 and 129.

DONALD E. CZAJA, *Primary Examiner.*

R. A. WHITE, *Assistant Examiner.*

U.S. Cl. X.R.

260—47